United States Patent [19]

Dewhirst

[11] Patent Number: 5,068,268

[45] Date of Patent: Nov. 26, 1991

[54] EPOXY POLYMER MATERIALS

[75] Inventor: Kenneth C. Dewhirst, Houston, Tex.

[73] Assignee: Shell Oil Company, Houston, Tex.

[21] Appl. No.: 405,915

[22] Filed: Sep. 12, 1989

[51] Int. Cl.$^5$ ............................................. C08G 59/50
[52] U.S. Cl. ................................... 523/445; 523/466; 523/468; 528/97; 528/98; 528/104
[58] Field of Search .......................... 528/97, 98, 104; 523/445, 466, 468; 568/721

[56] References Cited

U.S. PATENT DOCUMENTS

| | | | |
|---|---|---|---|
| 4,684,678 | 8/1987 | Schultz et al. | 523/466 |
| 4,786,668 | 11/1988 | Dewhirst | 523/445 |
| 4,786,669 | 11/1988 | Dewhirst | 523/445 |
| 4,847,011 | 7/1989 | Dewhirst et al. | 568/721 |
| 4,861,810 | 8/1989 | Dewhirst | 528/104 |

FOREIGN PATENT DOCUMENTS 249263 12/1987 European Pat. Off. .

*Primary Examiner*—Paul R. Michl
*Assistant Examiner*—Yong S. Lee

[57] ABSTRACT

New epoxy polymers comprise lightly crosslinked linear molecules prepared from segments containing stiff units interconnected to form internally non-rotating, planar segments.

19 Claims, No Drawings

EPOXY POLYMER MATERIALS

FIELD OF THE INVENTION

The present invention relates to new polymer materials which are epoxy polymers comprising linear molecules containing certain stiff-planar units and having improved modules.

BACKGROUND OF THE INVENTION

Epoxy polymers have a variety of properties. However, some of these polymers can be difficult to use in certain applications, such as the nautical industry, because high modulus properties are desirable. Accordingly, Applicant realized that there was still a need for new epoxy polymers with high modulus, which the present invention now provides.

SUMMARY OF THE INVENTION

The present invention is directed to a polymer composition comprising lightly crosslinked linear molecules having the repeating structures prior to crosslinking of the formula

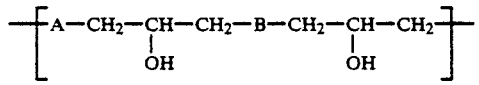

(I)

wherein
(a) A is selected from the group consisting of

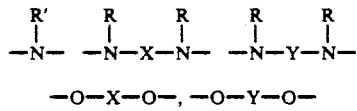

and mixtures thereof, and
B is selected from the group consisting of

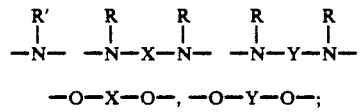

(b) each R is independently selected from the group consisting of unsubstituted or inertly substituted $C_1$–$C_{20}$ aliphatic, cycloaliphatic or aralkyl groups; and R' is independently selected from the group of substituents used to define R plus unsubstituted or inertly substituted aryl groups;
(c) said repeating structures are lightly crosslinked such that between 1 and 50 of said repeating structures per 100 total repeating structures are crosslinked to repeating structures of other molecules;
(d) X and Y each independently is a segment comprising stiff units (SU and SU', respectively) and optional flexible units (FU and FU', respectively), which stiff units and flexible units are interconnected;
(e) said stiff units, SU and SU', are independently elected from the groups consisting of unsubstituted and substituted monocyclic or fused two to four ring polycyclic aromatic groups consisting of benzene or fused benzene rings and non-interfering five to six membered heterocyclic rings;
(f) said flexible units, FU and FU', are independently selected from the group consisting of

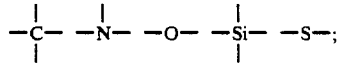

(g) the ratio of the number of stiff units to flexible units in said X segment (SU/FU) is equal to or greater than the ratio of the number of stiff units to flexible units in said Y segment (SU'/FU'); and
(h) with the provision that about 50% or more of the total A and B groups in the polymer are selected from groups containing X or Y which consist of stiff units interconnected to form internally non-rotating, planar segments.

PREPARATION

The polymers of the invention are prepared by the reaction between a diepoxide and a diphenol, which requires the presence of a condensation catalyst, as is well known in the art of epoxy resins, or an amine component or mixtures of a diphenol and an amine component. When required, typically, the catalyst is a basic catalyst. The process and the conditions of the preparation process are, thus, conventional in the art and include those disclosed in U.S. Pat. Nos. 4,786,668, 4,786,669 and Ser. No. 871,950, which disclosures are incorporated herein by reference.

The polymers of the invention are prepared from a diepoxide component and a diphenol or an amine component or mixture of a diphenol and an amine component and contain about 50% or more of the total A plus B groups selected from groups containing X or Y segments which consist of stiff units interconnected to form internally non-rotating, planar segments. A prepolymer can be prepared which can be stored for later reaction or which can be reacted in the presence of the condensation catalyst to form said linear polymers.

An important part of the present invention is the stiff units (SU and SU') and the optional flexible units (FU and FU') which are interconnected to form the segments X and Y and which are selected in appropriate types and ratios so that about 50% or more of the total A and B groups in the polymer are selected from groups containing X or Y which consist of stiff units interconnected to form internally non-rotating, planar segments.

As stated above, about 50% or more of the total A plus B groups in the polymer are selected from groups containing X or Y which consist of only one or more stiff units interconnected to form internally non-rotating, planar segments. In such case, the total stiff units in a segment are identical to the stiff segment. In the total X plus Y segments in which the stiff units are interconnected to form internally non-rotating, planar stiff segments, the stiff units can be the same or different stiff units. The interconnection of stiff units in a non-rotating, planar stiff segment in this manner eliminates rotation that would otherwise occur around bonds formed outside of a stiff ring unit within the segment and thereby provides an internally non-rotating, planar segment that is substantially flat. "Internally non-rotating" refers to an essentially rigid-bond between two adjacent atoms or groups which does not permit rotation of the atoms or groups, i.e., a single stiff unit or fusion of stiff units when more than one stiff unit is used to form the internally non-rotating, planar stiff segments. For example, biphenyl and biphenyl(isopropylidene) are rotating segments. A biphenylfluorene segment has rotating phenyl groups and is also non-planar. Benzene, naphthalene, anthracene and phenanthracene, per se, and the corresponding heterocyclic groups are both non-rotating and planar and thus, are stiff segments consisting of only stiff units interconnected to form an internally non-rotating, planar segment.

STIFF UNITS

The stiff units are unsubstituted or inertly substituted benzene, and non-interfering heterocyclic rings. Suitable substituent groups include Cl, Br, or $C_1$ to $C_5$ alkyl groups and the like.

The term "benzene" or "fused benzene rings" refers to unsubstituted and substituted benzene rings and includes the benzene ring and fusion or annulation of benzene of up to four rings to give naphthalene, anthracene, phenanthrene and the like.

The term "heterocyclic ring" refers to the corresponding unsubstituted and substituted saturated, unsaturated or aromatic heterocyclic rings in which one or more carbon atoms of the ring(s) is replaced by an atom of N, S or O and in which one or more carbon atoms of the 5-6 membered heterocyclic rings are single rings and fusion or annulation of such single rings of up to four rings, such as pyrrole, pyridine, oxazole, thiazole, dibenzothiophene, carbazole and the like. In the selection of heterocyclic rings, O and S heterocyclics are generally suitable. However, in the case of N heterocyclics, care should be taken so that the N is not strongly basic so that homopolymerization of the epoxide occurs.

FLEXIBLE UNITS

By use of the term "flexible unit" is meant those units that permit rotation at an angle to the linear axis of the polymer. Examples of flexible units include

| Broad group | Examples within the broad group |
| --- | --- |
| $-\overset{\mid}{\underset{\mid}{C}}-$ | $-\overset{H}{\underset{H}{C}}-,\ -\overset{H}{\underset{\mid}{C}}-,\ -\overset{CH_3}{\underset{CH_3}{C}}-,\ -\overset{O}{\underset{\mid}{C}}-,\ -\overset{F}{\underset{F}{C}}-$ |
| $-\overset{\mid}{N}-$ | $-N-\overset{O}{\underset{\mid\mid}{C}}-$ |
| $-O-$ | $-O-\overset{O}{\underset{\mid\mid}{C}}-$ |
| $-\overset{\mid}{\underset{\mid}{Si}}-$ | $-O-\overset{\mid}{\underset{\mid}{Si}}-O-$ |
| $-S-$ | $-\overset{O}{\underset{\underset{O}{\mid\mid}}{\underset{\mid\mid}{S}}}-$ |

SELECTION OF STIFF AND FLEXIBLE UNITS FOR STIFF AND FLEXIBLE SEGMENTS

One aspect of the invention is the selection and location of the stiff units and flexible units for the stiff segments and flexible segments. The stiff units and optional flexible units are attached in such a manner that the end units of the segments X and Y are always stiff units. The stiff segment can be located in either the diphenol or amine component or in the diepoxide component or in each of the components.

While the invention is generally described in terms of one X and one Y segment, it should be understood that polymers of the invention can be prepared having more than two different components, and, thus, more than one kind of X and/or Y segment.

In one preferred embodiment of the invention, the ratio of stiff units to flexible units in the stiff segment is equal to the ratio of the stiff units to flexible units in the flexible segment.

Preferably, about 55% or more of the total A and B groups in the polymer are selected from groups containing X and Y which consist of internally non-rotating, planar stiff units as a part of the linear chain. More preferably, about 75% or more of the A and B groups each are selected from groups containing X or Y which consist of internally non-rotating, planar stiff units. The best modulus properties are usually obtained when there are internally non-rotating, planar stiff units in each of the A and B groups in the polymer such that substantially all of the A and B groups contain X or Y (about 100%) which are internally non-rotating, planar stiff segments.

DIEPOXIDE COMPONENT

One component of the polymer compositions of the invention is a diepoxide having two epoxide groups in the terminal or non-terminal positions in the molecule, usually in the form of an oxygen atom bound to two terminal carbon atoms of an alkyl group although the epoxide can be on a ring, such as a cyclohexyl ring and the like. Suitable diepoxides include terminal diepoxyalkanes, such as 1,2-epoxy-3,4-epoxybutane, 1,2-epoxyhexane, 1,2-epoxy-7,8-epoxyoctane and the like. Others include terminal diepoxies containing ether linkages, such as bis(2,3-epoxypropyl)ether, bis(2,3-epoxy-2-methylpropyl)ether and the like; diglycidyl ether of alpha,omega glycols, such as the diglycidyl ethers of ethylene glycol, triethylene glycol, tetraethylene glycol and the like, and diglycidyl ethers of dihydric phenols.

The diglycidyl ethers of dihydric phenols which are generally suitable for use in the present invention include the diglycidyl ethers of the same diphenol or of different diphenols and the diphenols in the diglycidyl ether reactant can be the same as the diphenols used as the diphenol component in the reaction or they can be different.

In preparing the polymers of the invention, the diepoxide reactant can be a pure diepoxide or a crude mixture containing a substantial preparation of diepoxide, e.g., 70% or more. It is, however, usually important for good polymer properties that the crude reactant be free of monoepoxide and of monohydric phenol or alcohol. Suitable diepoxide can be prepared from a diphenol of the type previously described herein above. Concentrates of diepoxide containing between 90 to 100 percent of pure compound are preferred for better polymer properties.

Examples of suitable diepoxides in which the stiff segment consists of only stiff units which interconnect to form internally non-rotating, planar segments include diglycidyl-1,6-dihydroxynaphthalene, diglycydyl-1,3-dihydroxybenzene, diglycidyl-2,3-dihydroxynaphthalene, diglycidyl-2,7-dihydroxynaphthalene, diglycidyl-1,4-d dihydroxynaphthalene, diglycidyl-1,4-dihydroxybenzene, diglycidyl-1,6-dihydroxyanthracene, diglycidyl-1,6-dihydroxyphenanthracene and the like. The diepoxide used in the invention can also have the structures

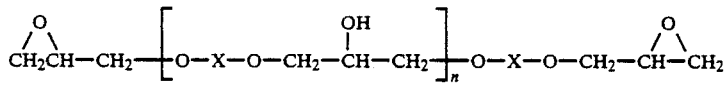
(I)

or

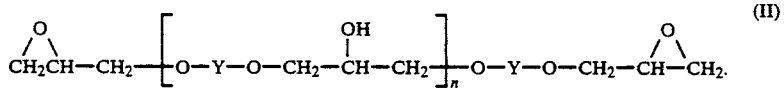
(II)

The number "n" has a value of from about 0 to about 6, preferably, from about 0 to about 2, most preferably 0, and X and Y have the earlier mentioned meanings.

DIEPHENOL COMPONENT

The diphenol components employed herein have the structure HO-X-OH and HO-Y-OH wherein X represents the stiff segment specified above and Y represents the flexible segment specified above. X and Y each is symmetrical or assymmetrical as such diphenol components are generally known in the art.

One group of symmetric diphenol components particularly useful herein are represented by the formula

in which R and $R_1$ when taken collectively with the connector carbon C are selected from the group consisting of cyclohexyl and alkyl-substituted cyclohexyl, and when taken separately are from the group consisting of hydrogen, alkyl, cyclohexyl, phenyl, alkyl-substituted cyclohexyl, alkyl-substituted phenyl, halogen-substituted cyclohexyl and halogen-substituted phenyl groups with the total number of carbon atoms in the group or groups attached to said connector carbon atom not exceeding about eighteen and the number of carbon atoms, in any alkyl-subsitutent not exceeding about six.

The preferred diphenols have the hydroxyl groups in the 4,4' positions, but compounds with hydroxyls in the 2,2', 3,3' and other arrangements can also be used. R and $R_1$ suitably are methyl, ethyl, isobutyl, n-nonyl, n-heptadecyl and the like. Other dihydric phenols can also be employed, excepting those which have two hydroxyl groups in the ortho positions on a single benzene ring which do not form substantially linear molecules.

If desired, the diphenol compounds can be represented by the formula

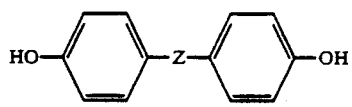

in which Z is $-SO_2-$, $-C(O)-$ or $-C(R)(R')-$ in which R and $R_1$ are selected from the group consisting of hydrogen, alkyl, phenyl, alkyl-substituted phenyl, and halogen-substituted phenyl groups with the total number of carbon atoms in the group or groups attached to said connector carbon atom not exceeding about eighteen and the number of carbon atoms, in any alkyl-subsitutent not exceeding about six.

Other diphenol components useful herein are the imide-derived diphenols, such as those compounds disclosed in U.S. Pat. No. 3,821,162 and reported by J. E. McGrath, 29th National SAMPE Symposium, April 3-5, 1984, p. 447, the disclosures of which are incorporated herein by reference.

Still another group of diphenol compounds are those distinguished from BPA by the presence of 2 or more flexible groups which are used to connect additional stiff units in the linear chain of a segment such as alpha, alpha'-bis(1-hydroxy-2-naphthyl)-p-diisopropylbenzene. These compounds are disclosed in the earlier referenced U.S. patents of this same Applicant.

Examples of suitable diphenols in which the stiff segment consists of only stiff units interconnected to form internally non-rotating, planar segments include 1,6-dihydroxynaphthalene, 2,7-dihydroxynaphthalene, 2,3-dihydroxynaphthalene, 1,4-dihydroxynaphthalene, 1,4-dihydroxybenzene, 1,3-dihydroxybenzene, 1,6-dihydroxyanthracene, 1,6-dihydroxyphenanthracene and the like.

The dihydric phenols employed in the process of the invention can be substantially 100 percent pure, or can be a technical grade of somewhat lower purity. Concentrates of diphenol containing, for example, 90 to 100 percent of the pure compound can be used.

AMINE COMPONENT

The amine component employed in making the polymers of the present invention is selected from the group consisting of primary amines, bis-secondary amines or mixtures thereof.

The primary amines have the formulas

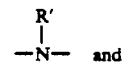 and the bis-secondary amines have the formulas

wherein each R is independently selected from unsubstituted or inertly substituted $C_1$ to $C_{20}$ aliphatic, cycloaliphatic or aralkyl groups; R' is independently selected from the group of substituents used to define R plus unsubstituted or inertly substituted aryl groups; and X and Y are the previously defined segments. Examples of R and R' include methyl, ethyl, isopropyl, cyclohexyl, benzyl and the like. Preferably, each R is independently selected from $C_1$ to $C_{10}$ alkyl groups and $R^1$ is phenyl.

Examples of primary amines include aniline, 2,6-dimethylaniline, 2,4-dimethylaniline, 2,6-diethylaniline, N-aminophthalimide, 2,6-diisopropylaniline, tolylamine, alpha-napthylamine, 3-aminobenzothiophene and the like.

Examples of bis-secondary amines include bis(4-methylaminophenyl) sulfone, N,N'dimethyl-p-phenylenediamine, bis-(N-sec-butyl-4-aminophenyl)methane, alpha,alpha'-bis-(N-methyl-4-aminophenyl-p-diisopropylbenzene, N,N'-dimethyl-4,4-diaminodiphenyl sulfone and the like.

Examples of suitable bis-secondary amines in which the stiff segment consists of stiff units interconnected to form internally non-rotating, planar segments include 1,4-bis(methylamino)naphthalene, 1,8-bis(methylamino)naphthalene, 1,4-bis(methylamino)benzene, 1,3-bis(methylamino)benzene and the like.

ISOMERS

The diphenol, bis-secondary amine and/or diglycidyl ethers of bisphenol monomers can exist as ring position isomers because of the location of the hydroxy groups on the rings of these monomers. The polymers resulting from the different isomeric monomers can have different properties. It is understood the invention includes the polymers of the various isomeric monomers.

LIGHT CROSSLINKING

An important aspect of the present invention relates to the light crosslinking of the resulting thermoplastic polymers molecules to form the resulting polymer matrix. The term "light crosslinking" refers to the crosslinking of between 1 to about 50 out of each 100 repeat units to other repeat units of other molecules, e.g., formula 1, of the thermoplastic polymer. Preferably, the light crosslinking density is between about 2 and about 25 repeat units per 100 repeat units.

There are several known techniques that can be used to obtain lightly crosslinked matrices. One technique involves the use of a slightly greater number of epoxide groups than phenol groups. Another technique is to incorporate an appropriate amount of tri- or higher functional epoxide, phenolic or amine component in the preparation of the polymer. A third technique involves the addition of crosslinking agents, such as triepoxides and the like, to the resulting thermoplastic polymer. These kinds of techniques are generally known in the art and are also described in Applicant's above referred to allowed U.S. patent applications, the disclosures of which are incorporated herein by reference.

USES

The polymer compositions of the invention have application as adhesives and where modulus is useful and particularly in the automotive, nautical, and aerospace industries high performance obtainable with the present compositions of the invention is required.

The polymers of the invention are preferably used with a reinforcing material. Suitable reinforcing materials include, glass fibers, carbon fibers, Kevlar, boron, calcium carbonate, talc, alumina, asbestos, and the like. The fibrous reinforcing material can be present in the composition in an amount effective to impart increased strength and stiffness to the cured composition, generally between about 40 to about 95 weight percent, usually about 60 to about 80 weight percent, based on the weight of the total composition.

For nautical applications, the compositions of the invention usually have a glass transition temperature of less than about 150° C. and a flex modulus of at least about 450 ksi, preferably above 500 ksi.

The compositions were tested according to the following test procedures:

Flexural properties of neat resins were evaluated according to ASTM D790 method using ⅛ in. thick specimens. Specimens were tested both in dry (at room temperature and ~75% R.H.) and hot/wet (after immersion in boiling water for 48 hours, test at 200° F., 5 min. equilibration time) conditions.

Fracture toughness, Kq, was measured using mini-compact tension - specimens (see W. B. Jones et al. *Am. Chem. Soc., Div. Polym. Chem., Polym. Prepr.*, 22, 1981). All specimens were slotted to a Chevron shape and then precracked with a razor blade.

Tensile properties were measured according to ASTM D638 method.

Swelling in solvents was evaluated by measuring weight gain per unit of initial weight after immersion in solvent for a specified time at room temperature.

ILLUSTRATIVE EMBODIMENTS

The invention is illustrated by the following embodiments which should not be regarded as limiting the invention in any way. The products were confirmed by elemental, nuclear magnetic resonance spectral analysis and the like, as necessary.

Embodiment 1

Raw Materials 1,6-dihydroxynaphthalene (DHN16) was purchased from Aldrich and dried in a vacuum oven. It was glycidated and dehydrochlorinated by standard procedures to give the corresponding diglycidyl derivative (DGDHN16), WPE=153, Sap Chlorine=0.003% wt, and dried in a vacuum oven.

Polymerization to Lightly Crosslinked Polymer

The polymer was prepared by melting 33.43 g of DGDHN16 and 16.42 g of DHN16 together with 0.045 g of monosodium bisphenol A (NaBPA) at 160° C. in a vacuum Erlenmyer flask, degassing the melt at 1 mm Hg until bubbling ceased, pouring the molten prepolymer into a glass mold treated with silicon release agent and curing in a forced draft oven at 160° C. for 16 hrs followed by 2 hrs at 180° C. At the end of the cure cycle, the mold was taken out of the oven, cooled to about 120° C., and the plates were popped loose. The following properties were obtained:

glass transition temperature, Tg=138° C.
fracture toughness, Kq=1500 psi√in
Flex Modulus E=490 ksi
Flex Strength=24 ksi
Elongation=>8%
Swelling in methyl ethyl ketone (MEK)=16% wt gain (2 week immersion).

Embodiments 2-11

Following procedures similar to those described in Embodiment 1 above, the following lightly crosslinked polymers were prepared from bisphenols and diglycidyl ethers of bisphenols as set forth in Table I below.

TABLE 1

Lightly Crosslinked Polymers

| Bisphenol | Diglycidyl | $E_t^{(a)}$ ksi | MEK Wt. Gain Swelling, % | $K_q^{(b)}$ psi $\sqrt{\text{in.}}$ | Tg, °C |
|---|---|---|---|---|---|
| DHN16 | DGBPA | 451 | 67 | 3900 | 123 |
| DHN16 | DGBPFL | — | 55 | — | 199 |
| DHN27 | DGBPFL | — | 48 | — | 199 |
| DHN14 | DGDHN16 | 515 | 46 | 1300 | 138 |
| DHN27 | DGDHN16 | — | — | — | 135 |
| DHN23 | DGDHN16 | 520 | 2 | 600 | 132 |
| BPFL[c] | DGBPFL | — | 139 | 600 | 222 |
| BP[c] | DGBPFL | 340 | 74 | 1600 | 198 |
| BP[c] | DGBPA | 280 | — | 4300 | 128 |
| BPA[c] | DGBPA | 380 | 65 | 5000 | 115 |

NOTE:
A dash (—) means there was no test.
[a]flex modulus
[b]fracture toughness
[c]polymer - not according to the invention.
BP is 4,4'-dihydroxybiphenyl
BPA is 2,2-bis(4-hydroxyphenyl)propane
BPFL is 9,9-bis(4-hydroxyphenyl)fluorene
DHN14 is 1,4-dihydroxynaphthalene
DHN27 is 2,7-dihydroxynaphthalene
DHN23 is 2,3-dihydroxynaphthalene
DGBPA is 2,2-bis[4-(2,3-epoxypropoxy)phenyl]propane
DGBPFL is 9,9-bis[4-(2,3-epoxypropoxy)phenyl]fluorene Again, the polar lightly crosslinked polymers of the invention generally had unexpected high modulus and resistance to very strong solvents, such as methyl ethyl ketone and methylene chloride, which are used as paint stripping solvents. At the same time, the polymers of the invention had a very good balance of tensile strength, fracture toughness, and/or glass transition temperature.

Embodiments 12–15

1,4-bis(methylamino)benzene is reacted with a slight excess of the diglycidyl ethers of 2,3-dihydroxynaphthalene, 2,7-dihydroxynaphthalene, 1,6-dihydroxynaphthalene, 1,4-dihydroxybenzene in the presence of a multifunctional crosslinking agent to form lightly crosslinked polymers.

What is claimed is:

1. A polymer composition comprising lightly crosslinked linear molecules having the repeating structures prior to crosslinking of the formula

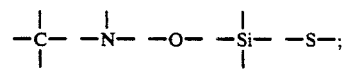

wherein
(a) A is selected from the group consisting of

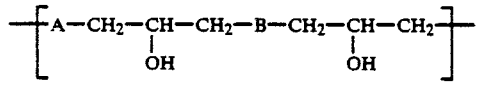

and mixtures thereof, and
B is selected from the group consisting of

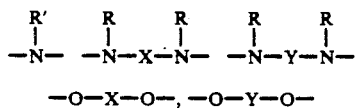

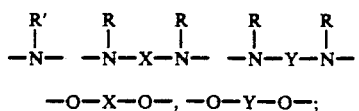

(b) each R is independently selected from the group consisting of unsubstituted or inertly substituted $C_1$–$C_{20}$ aliphatic, cycloaliphatic or aralkyl groups; and each R' is independently selected from the group of substituents used to define R plus unsubstituted and inertly substituted aryl groups;

(c) said repeating structures are lightly crosslinked such that between 2 and 25 of said repeating structures per 100 total repeating structures are crosslinked to repeating structures of other molecules;

(d) X and Y each independently is a segment comprising stiff units (SU and SU', respectively) and optional flexible units (FU and FU', respectively), which stiff units and flexible units are interconnected;

(e) said stiff units, SU and SU', are independently selected from the groups consisting of unsubstituted and substituted monocyclic or fused two to four ring polycyclic aromatic groups consisting of benzene or fused benzene rings and non-interfering five or six number heterocyclic rings;

(f) said flexible units, FU and FU', are independently selected from the group consisting of $$-\overset{|}{\underset{|}{C}}-\quad -\overset{|}{N}-\quad -O-\quad -\overset{|}{\underset{|}{Si}}-\quad -S-;$$

and
(g) the ratio of the number of stiff units to flexible units in said X segment (SU/FU) is equal to or greater than the ratio of the number of stiff units to flexible units in said Y segment (SU'/FU'); and (h) with the provision that about 50% or more of the total A and B groups in the polymer are internally non-rotating, planar segments derived from at least one of a dihydroxynaphthalene or a diglycidyl ether of a dihydroxynaphthalene.

2. The composition according to claim 1 wherein about 55% or more of the total A and B groups in the polymer are selected from groups containing X or Y which consist of said internally non-rotating, planar segments.

3. The composition according to claim 1 wherein about 75% or more of the total A and B groups in the polymer are selected from groups containing X or Y which consist of said internally non-rotating, planar segments.

4. The composition according to claim 1 wherein about 100% of the total A and B groups in the polymer are selected from groups consisting of X or Y which consist of said internally non-rotating, planar segments.

5. The composition according to any one of claims 1–4 wherein the internally non-rotating, planar segments are derived from the group consisting of 1,6-dihydroxynaphthalene, 2,7-dihydroxynaphthalene, 2,3-dihydroxynaphthalene and 1,4-dihydroxynaphthalene.

6. The composition according to claim 1 wherein the dihydroxynaphthalene is 1,6-dihydroxynaphthalene.

7. The composition according to claim 6 wherein any flexible segment present is derived from bisphenol A, a diglycidyl ether of bisphenol A or a mixture thereof.

8. The composition according to claim 6 wherein any remaining segments are derived from 9,9-bishydroxyphenylfluorene, a diglycidyl ether of 9,9-bishydroxyphenylfluorene or a mixture thereof.

9. The composition of claim 1 which is lightly crosslinked such that between 2 and about 20 repeating structures from different molecules per 100 and of said repeating structures are crosslinked together.

10. The composition of claim 9 wherein between 3 and 10 per 100 repeating structures are crosslinked together.

11. The composition of claim 1 which further comprises a crosslinking agent.

12. The composition of claim 11 wherein an effective amount of crosslinking agent is employed such that between about 2 and about 20 repeating structures from different molecules per 100 of said repeating structures are crosslinked together during cure.

13. The composition of claims 9 or 12 which further comprises a fibrous reinforcing material.

14. The composition of claim 13 wherein the fibrous reinforcing material is selected from the group consisting of glass fibers, carbon fibers, boron fibers and Kevlar fibers.

15. The composition of claim 11 wherein the crosslinking agent is an amine.

16. The composition according to claim 11 wherein the crosslinking agent is a phenol.

17. The cured composition according to any one of claims 1-4 having a modulus of at least about 450 ksi.

18. A prepreg comprising the composition of claim 9 or 12 and a fibrous reinforcing material.

19. An article of manufacture prepared from the prepreg of claim 18.

* * * * *